Jan. 12, 1943.  C. P. DEIBEL  2,307,766

DRY CELL BATTERY UNIT

Filed Oct. 1, 1941

INVENTOR.
CYRIL P DEIBEL
BY Fay, Macklin, Gohrick, Williams
Chilton and Isler
ATTORNEYS.

Patented Jan. 12, 1943

2,307,766

UNITED STATES PATENT OFFICE 2,307,766

DRY CELL BATTERY UNIT

Cyril P. Deibel, Lakewood, Ohio

Application October 1, 1941, Serial No. 413,142

10 Claims. (Cl. 136—111)

This invention relates to a dry cell battery unit which is made up of a plurality of thin, wafer-like dry cells which are sealed within an outer casing in such a manner that the likelihood of leakage is reduced to a minimum, and which is particularly well adapted for use with hearing aids, portable radios and the like where space is at a premium and where a leak-proof battery is desirable.

One of the objects of the invention is to provide a dry cell battery unit of the character described which occupies little space for a given energy output and which is particularly well adapted for quantity production on automatic or semi-automatic machines.

Another object of the invention is to provide a dry cell battery unit having means for providing good electrical contact between the electrodes of adjacent cells, each cell being held in intimate contact with an adjacent cell and being enclosed within a layer of insulating material, the several cells being individually sealed in liquid-tight relation with respect to each other.

A further object of the invention is to provide a dry cell battery unit having the above described distinguishing features and characteristics and which has a high capacity and in which the number of soldered connections is reduced to a minimum and which will give a maximum of service hours and have a long shelf-life as well as an active life.

A still further object of the invention is to provide a dry cell battery unit which may be made in any desired size or shape and which may consist of any desired number of cells to give the desired voltage and capacity.

A still further object of the invention is to provide a dry cell battery unit which comprises an outer casing containing a plurality of wafer-like dry cells arranged therein in stacked relation and connected in series, each cell comprising a carbon cup containing a mass of mix, a separator disposed over each carbon cup and a zinc electrode disposed over each separator, each cell being encased within a thin layer of insulating material, such as "Pliofilm," having liquid-tight sealed engagement with the next adjacent cell; and means holding all of said cells within said outer casing in intimate electrical contact with each other under pressure.

Figure 1:
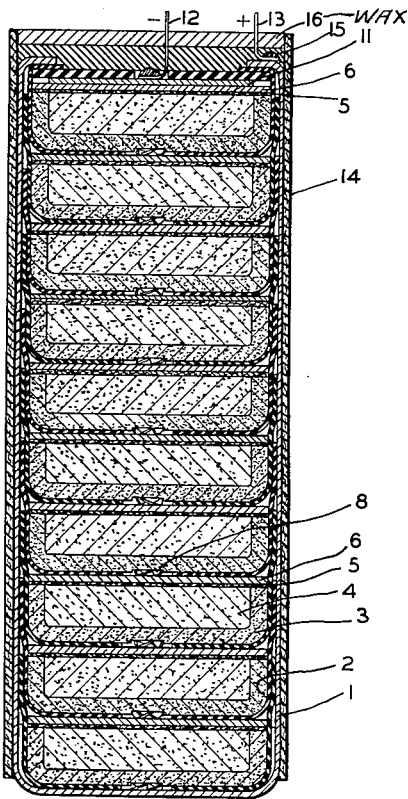
Figure 2:
Figure 2:
Figure 2:
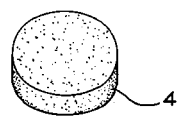
Figure 2:
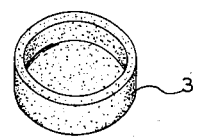
Figure 2:
Figure 2:
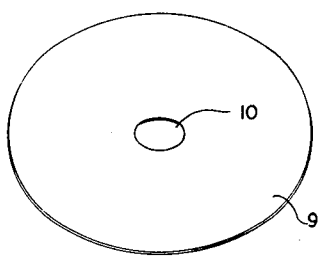
Figure 3:
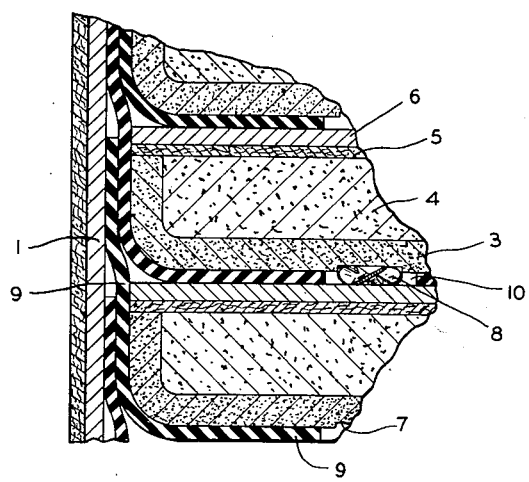

Further and more limited objects of the invention will appear as the description proceeds and by reference to the accompanying drawing in which Fig. 1 is a vertical sectional view of a dry cell battery unit embodying the features of my invention; Fig. 2 is a disassembled perspective view showing the several parts which make up each cell; and Fig. 3 is an enlarged fragmentary vertical sectional view of my improved battery unit showing the relative positions of the several parts, the several parts being considerably enlarged and exaggerated in order to more clearly disclose the construction.

Referring now to the drawing, the reference character 1 designates a container or casing preferably formed of metal and which contains a plurality of thin wafer-like dry cells indicated generally by the reference character 2. Each dry cell comprises a carbon cup 3 which receives a mass of depolarizing mix 4 therein. The mass of mix may be preformed or, if desired, it may be compressed within the carbon cup. Disposed over the carbon cup and closing the same is a paper separator 5 which is coated on both sides with battery paste. Disposed over and preferably co-extensive with the paper disk 5 is a zinc disk or electrode 6. Each carbon cup has a centrally disposed recess 7 in the bottom thereof which receives therein a spring-like electrical conductor 8, preferably formed of phosphor bronze. Each cell is encased within a layer of insulating material 9, such as "Pliofilm" or the like, which has liquid-tight engagement with the next adjacent cell. Pliofilm is hydrochlorinated rubber, that is, rubber to which hydrogen chloride has been added. Pliofilm is strong, somewhat stretchable, tear resistant, impervious to moisture and gas and resistant to oil and hydrocarbons and has the quality of being sealed by fusion when heat is applied thereto. Other materials having the desired qualities of Pliofilm may of course be used. Each Pliofilm layer is in the form of a disk and has a central opening 10 therein. When the cells are assembled, the Pliofilm disk is coated with a thin layer of oil or other suitable material so that it adheres to the next adjacent Pliofilm layer. A plurality of cells are arranged within the metal container in stacked relation as shown in Fig. 1, the spring-like conductor 8 serving to provide good electrical contact between each carbon cup and the next adjacent zinc electrode. The spring-like conductor 8 of the lowermost cell of course has contact with the bottom of the metal casing 1. Disposed over the uppermost cell is a terneplate disk 11 to which is soldered a negative terminal 12. Leading from the outer metal casing and soldered thereto is a positive terminal 13. The metal casing is enclosed within a paper jacket 14 and closing the upper end of the battery unit is an asphalt seal 15, which receives thereover a wax seal 16.

The individual cells are inserted within the outer container in any suitable manner. One form of apparatus for assembling the battery unit is disclosed in my copending application Serial No. 407,015, filed August 15, 1941. It will be noted that the size of each of the Pliofilm disks is such that when it is folded upwardly about the next adjacent cell it extends to a point near the top of the next adjacent cell, or in other words, the Pliofilm disk overlaps each next adjacent cell for a substantial distance and is sealed thereto by means of a thin layer of oil or other suitable material. The layers of Pliofilm have a thickness of approximately 3/1000 of an inch and therefore occupy very little space thus permitting a maximum quantity of active materials to be used.

While I prefer to use Pliofilm, it will of course be understood that I may use any thin insulating material having the desired qualities and characteristics. It will be noted that each cell is separately and individually encased within a layer of insulating material and that each layer of insulating material has liquid-tight sealed engagement with the next adjacent layer of insulating material of an adjacent cell so as to prevent the escape of electrolyte.

In assembling the cells, the metal casing 1, with the cells arranged therein, is placed within a suitable fixture and the cells placed under considerable compression. With the cells held in this condition, the upper edge of the metal casing is deflected or spun over inwardly to hold the cells in place in intimate electrical contact with each other. Any excess Pliofilm which may project from the top of the battery unit may be trimmed off although that operation may be performed before the upper edge of the casing is turned over. The two seals 15 and 16 serve to close both the insulating jacket and the metal casing. The innermost seal 15 is preferably formed of asphalt of such a character as to permit excessive pressure to be relieved. The outermost seal 16 is preferably formed of wax.

It is of course to be understood that the outer metal casing may be of any desired size or shape so as to receive the desired number of cells therein. The particular size of the individual cells may also be varied as the exigencies of the occasion may demand. Various other changes may be made in the shape, size and arrangement of parts as well as in the materials used without departing from the spirit of my invention.

It will now be clear that I have provided a dry cell battery unit which will accomplish the objects of the invention as hereinbefore stated. It is to be understood that the embodiment of the invention herein disclosed is to be considered merely illustrative and not in a limiting sense as the invention is limited only in accordance with the scope of the appended claims.

Having thus described my invention, what I claim is:

1. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, means electrically connecting each zinc electrode with the next adjacent carbon cup, each cell being encased within a thin layer of insulating material having liquid tight sealed engagement with the next adjacent cell, and means holding all of said cells within said outer casing in intimate contact with each other.

2. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, a spring-like electrical conductor providing good electrical contact between each zinc electrode and the next adjacent carbon cup, each cell being encased within a thin layer of insulating material having liquid-tight sealed engagement with the next adjacent cell, and means holding all of said cells within said outer casing in intimate contact with each other.

3. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, each carbon cup having a recess in the bottom thereof receiving a spring-like conductor therein which engages the zinc electrode of the next adjacent cell, each cell being encased within a thin layer of insulating material having liquid-tight sealed engagement with the next adjacent cell, and means holding all of said cells within said outer casing in intimate contact with each other.

4. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, means electrically connecting each zinc electrode with the next adjacent carbon cup, each cell being encased within a thin layer of Pliofilm having liquid-tight engagement with the next adjacent cell, and means holding all of said cells within said outer casing in intimate contact with each other.

5. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, a spring-like electrical conductor providing good electrical contact between each zinc electrode and the next adjacent carbon cup, each cell being encased within a thin layer of Pliofilm having liquid-tight engagement with the next adjacent cell, and means holding all of said cells within said outer casing in intimate contact with each other.

6. A dry cell battery unit comprisng an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, each carbon cup having a recess in the bottom thereof receiving a spring-like conductor therein which engages the zinc electrode of the next adjacent cell, each cell being encased within a thin layer of Pliofilm having liquid-tight engagement with the next adjacent cell, and means holding all of said cells within said outer casing in intimate contact with each other.

7. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, a spring-like electrical conductor providing good electrical contact between each zinc electrode and the next adjacent carbon cup, each cell being encased within a thin layer of insulating material having liquid-tight sealed engagement with the next adjacent cell, said outer casing having a portion thereof directed inwardly and holding said cells in intimate contact.

8. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, means electrically connecting each zinc electrode with the next adjacent carbon cup, each cell being encased within a thin layer of insulating material having liquid-tight sealed engagement with the next adjacent cell, said outer casing having a portion thereof directed inwardly and holding said cells in intimate contact.

9. A dry cell battery unit comprising an outer casing, a plurality of dry cells arranged within said casing and held in electrical contact with each other under pressure, each cell comprising a carbon cup containing a mass of depolarizing mix, a separator disposed over said carbon cup and a zinc electrode disposed over said separator, each carbon cup having a recess in its bottom thereof receiving a spring like conductor therein which engages the zinc electrode of the next adjacent cell, each cell being encased within a thin layer of insulating material having liquid-tight sealed engagement with the next adjacent cell, said outer casing having a portion thereof directed inwardly and holding said cells in intimate contact.

10. A dry cell battery unit comprising an outer metal casing, a plurality of thin wafer-like dry cells arranged within said casing and held in intimate contact with each other under pressure, each cell comprising a carbon cup containing a mass of mix, a paper separator closing said carbon cup and having a coating of battery paste on both sides thereof and a zinc electrode disposed over said separator, each carbon cup having a recess in its bottom thereof receiving a spring-like conductor therein which engages the zinc electrode of the next adjacent cell, each cell being encased within a thin layer of Pliofilm having liquid-tight engagement with the next adjacent cell, said metal casing having the upper end thereof bent over inwardly to hold said cells in place.

CYRIL P. DEIBEL.